United States Patent

[11] 3,575,275

| [72] | Inventors | James L. Reimers<br>San Jose;<br>Donald S. Meek, Saratoga; Warren S.<br>Smith, San Jose, Calif. |
|---|---|---|
| [21] | Appl. No. | 795,283 |
| [22] | Filed | Jan. 30, 1969 |
| [45] | Patented | Apr. 20, 1971 |
| [73] | Assignee | FMC Corporation<br>San Jose, Calif. |

[54] CONTAINER FEED AND DISCHARGE SYSTEM
7 Claims, 10 Drawing Figs.

[52] U.S. Cl. .................................... 198/24,
198/31, 198/32, 198/149
[51] Int. Cl. ......................................B65g 17/12,
B65g 47/04, B65g 47/21
[50] Field of Search.......................... 198/24, 28,
131, 137, 149, 153, 179; 198/32, 31 (A3)

[56] References Cited
UNITED STATES PATENTS
| 2,830,691 | 4/1958 | Nordquist.................... | 198/24X |
| 1,929,707 | 10/1933 | Mojonnier.................... | 198/37 |
| 3,072,239 | 1/1963 | Jones et al. .................. | 198/24 |
| 3,434,585 | 3/1969 | Lee ............................. | 198/131 |

FOREIGN PATENTS
| 1,247,919 | 8/1967 | Germany...................... | 198/24 |
| 1,275,441 | 8/1968 | Germany...................... | 198/24 |

Primary Examiner—Edward A. Sroka
Attorneys—F. W. Anderson and C. E. Tripp

ABSTRACT: A system for reliably guiding cylindrical containers supported on one end along a linear path and forming the containers into elongated rows of abutting containers. Transfer means for deflecting the rows of containers transversely into open articulating carriers while retaining the individual containers in each row in alignment. After the rows of containers have been processed a pusher is provided for positively deflecting the rows of containers transversely out of the carriers.

PATENTED APR 20 1971
3,575,275
SHEET 1 OF 5
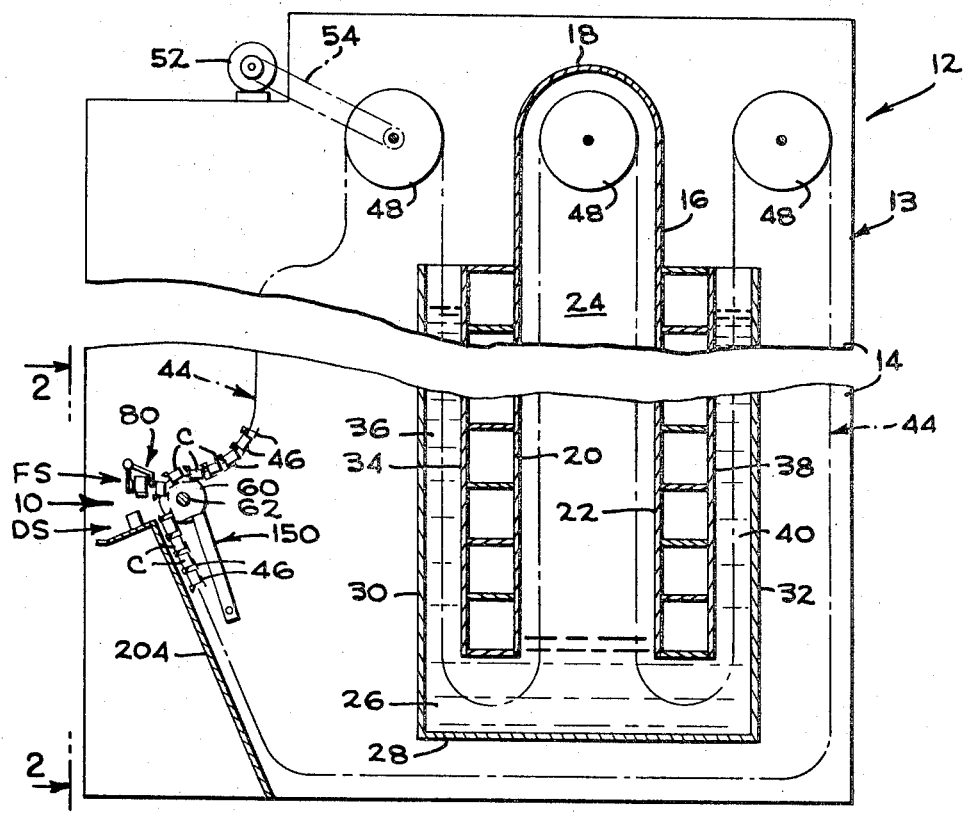
FIG_1
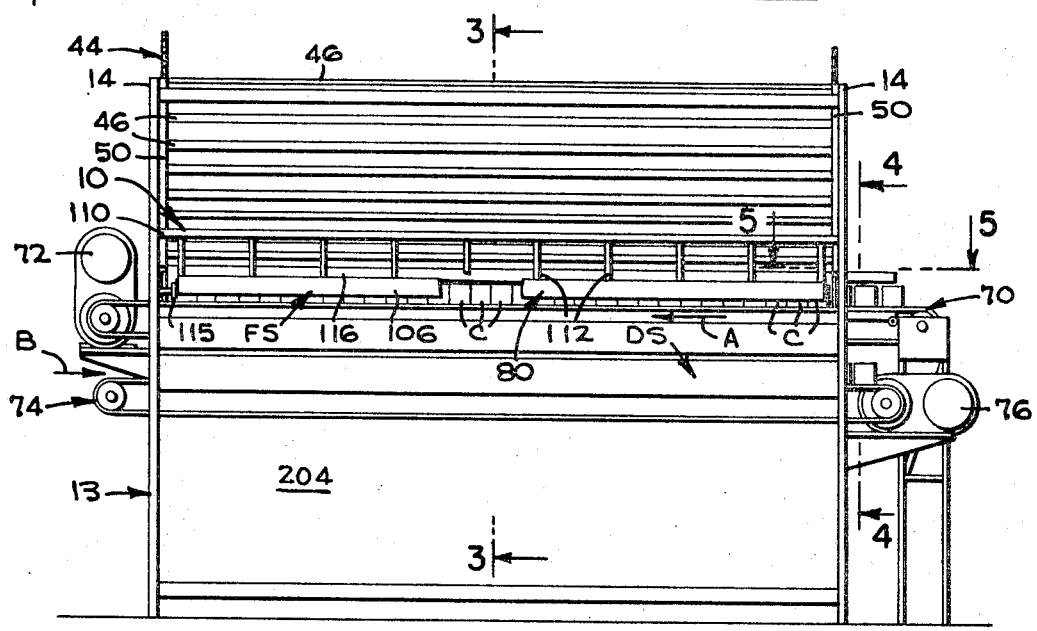
FIG_2
INVENTORS
JAMES L. REIMERS
DONALD S. MEEK
WARREN S. SMITH
BY *F.W. Anderson*
*C.E. Tripp*
ATTORNEYS

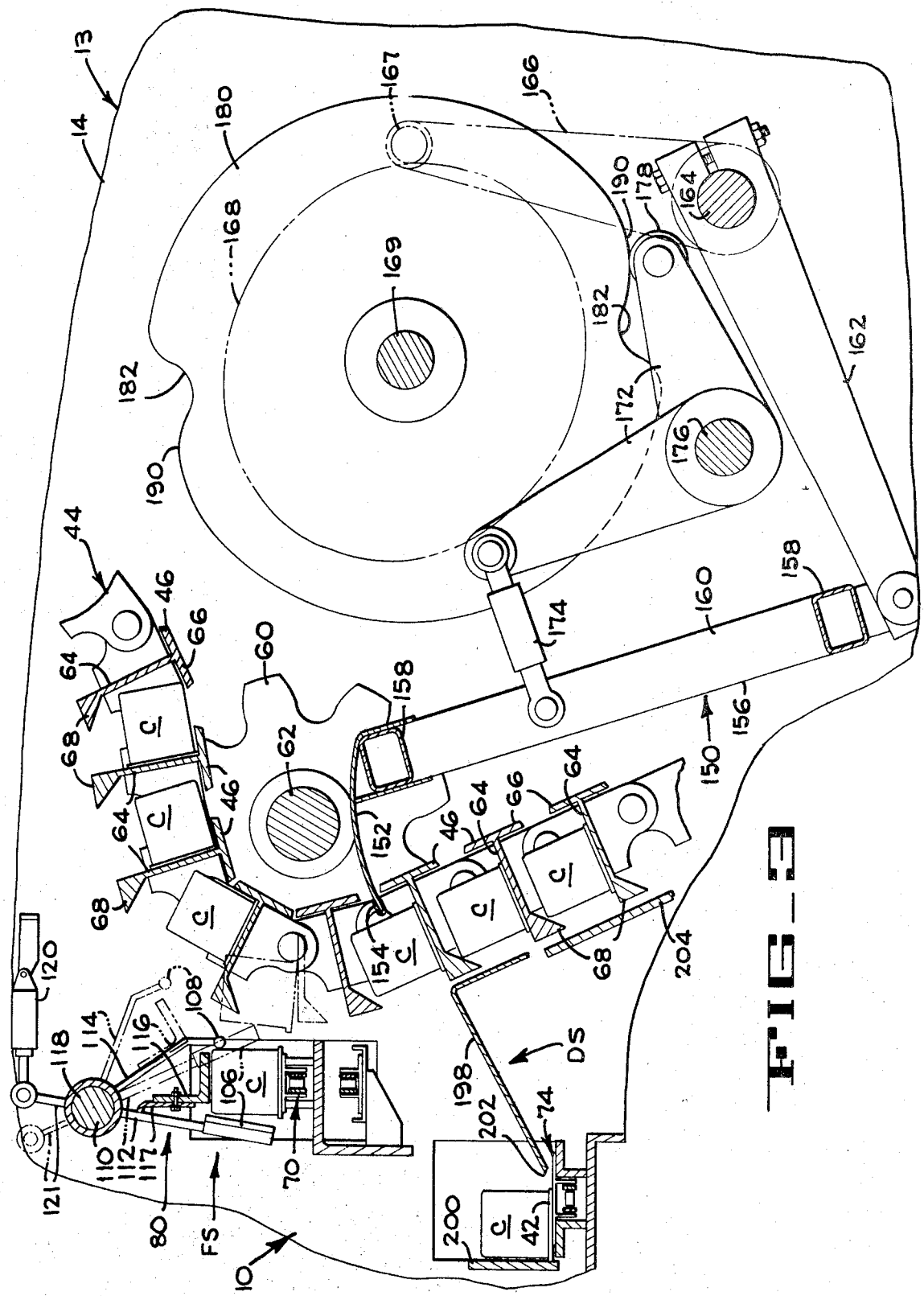

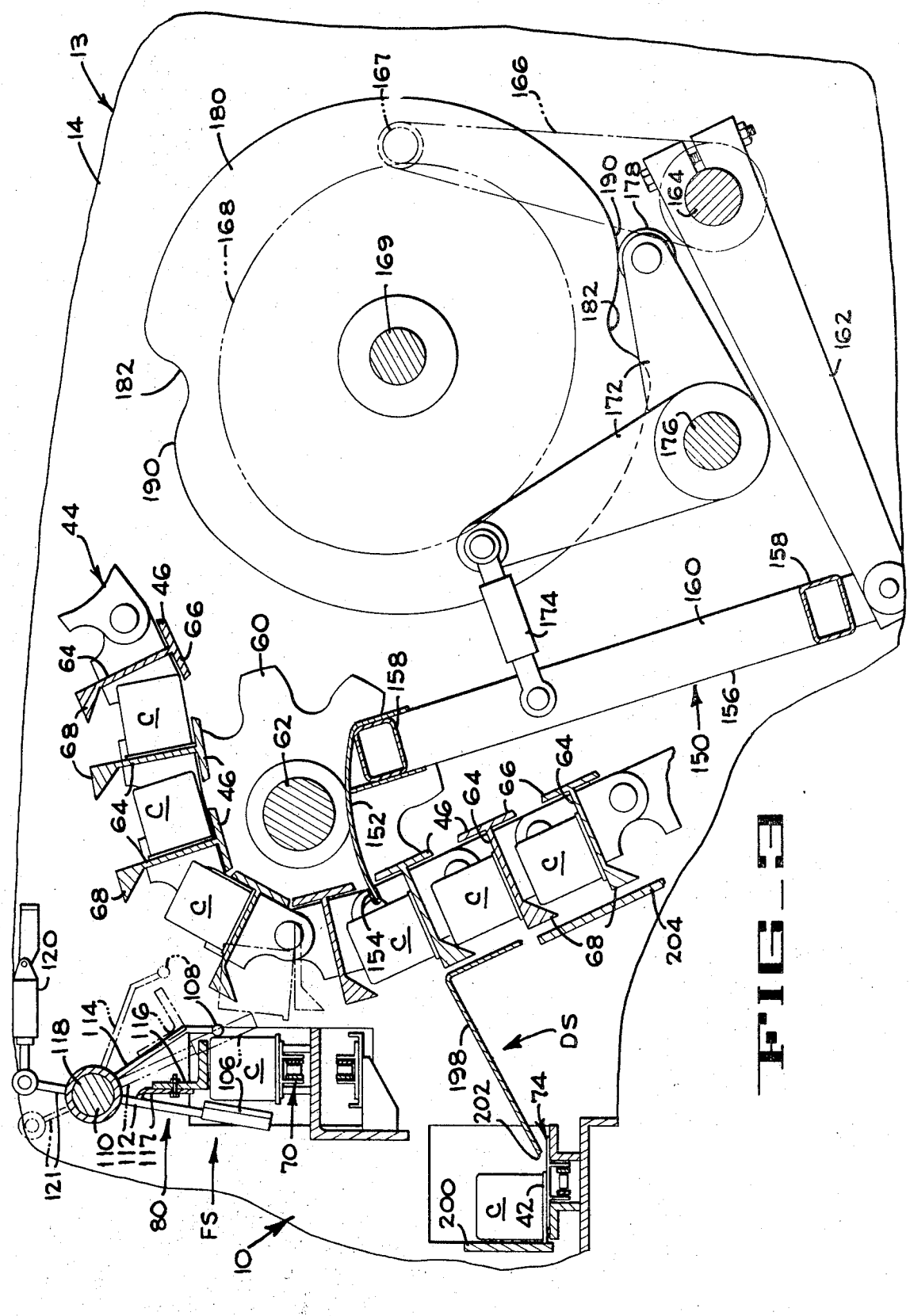

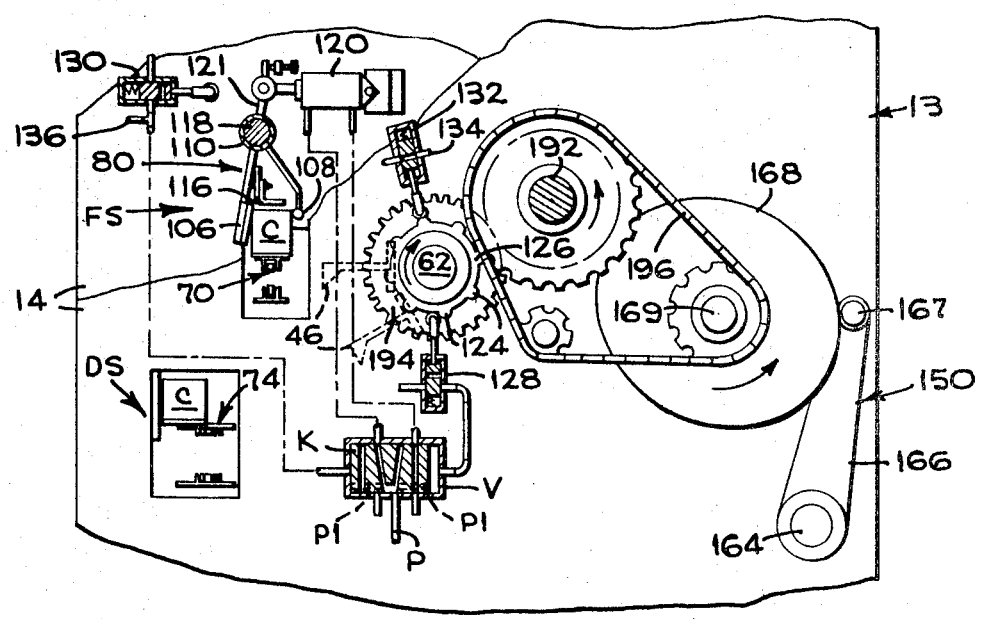
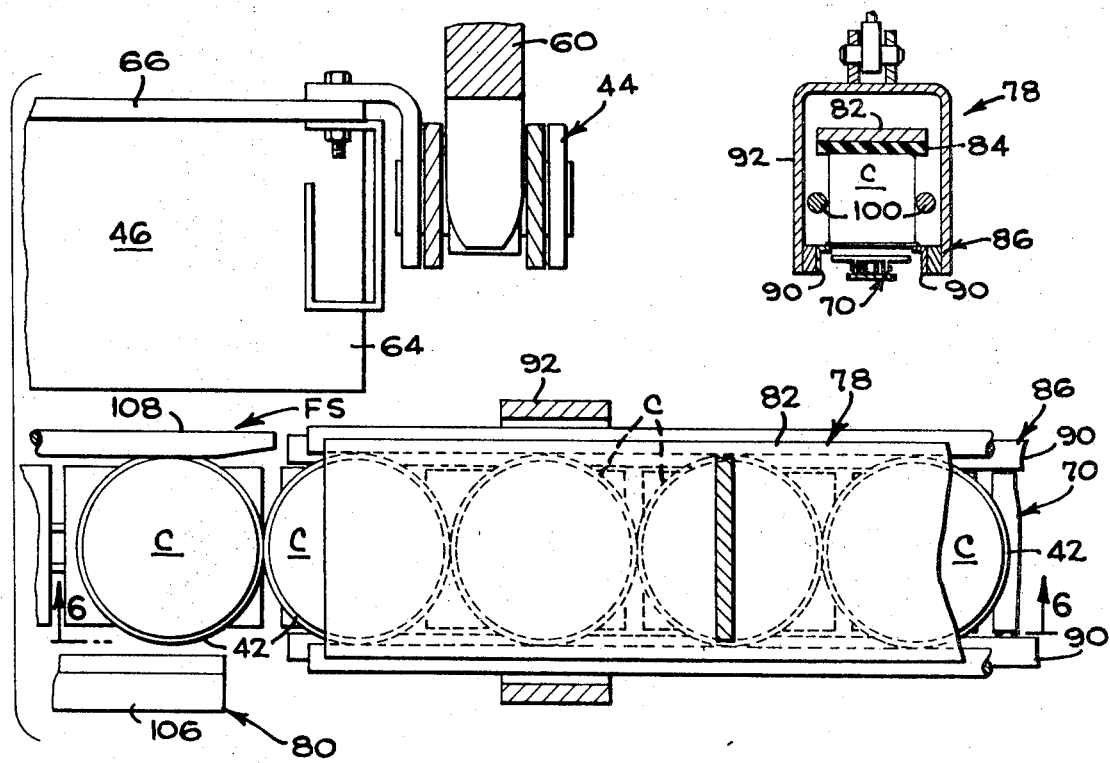

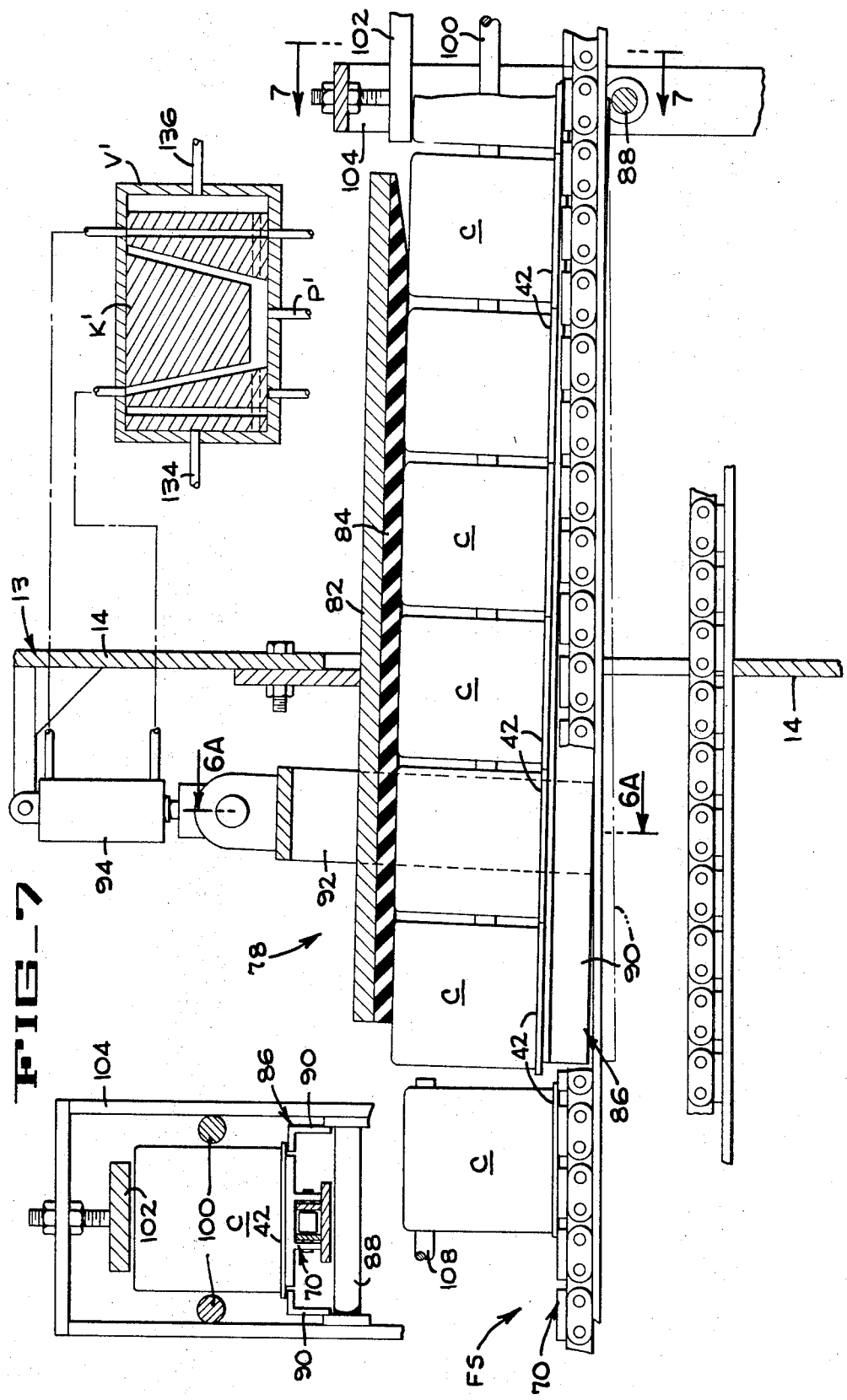

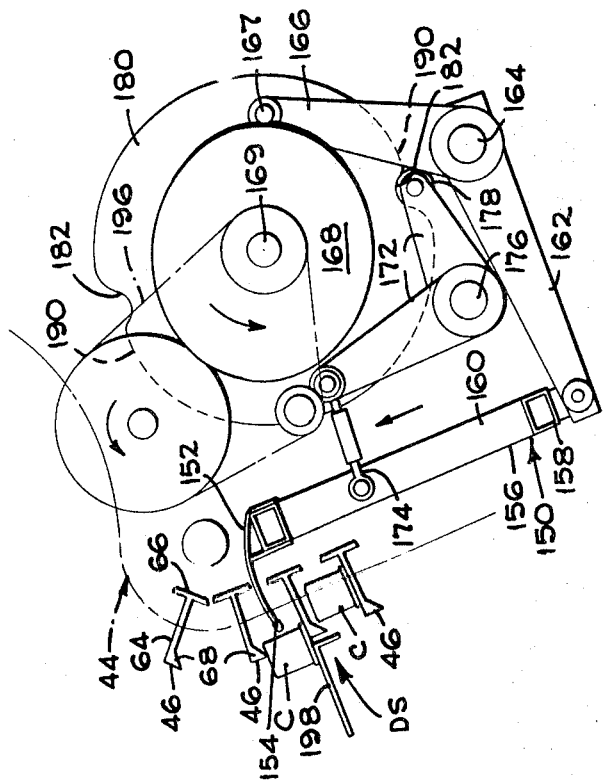
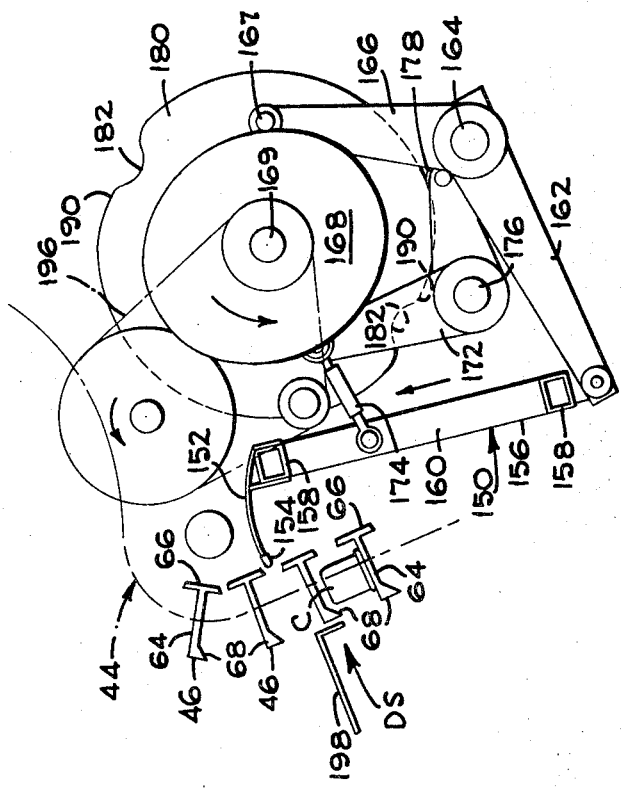

CONTAINER FEED AND DISCHARGE SYSTEM

BACKGROUND OF THE INVENTION

1. Field of the Invention

This invention pertains to the cooker art and more particularly relates to a feed and discharge system for cylindrical containers supported on their ends.

2. Description of the Prior Art

Cookers of the general type disclosed in the U.S. Pat. No. 3,067,850 to John F. French when adapted to use articulating carriers of the general type disclosed in U.S. Pat. No. 3,394,793 to Reimers et al. are arranged to handle cylindrical containers when the containers are supported on their cylindrical surfaces. The feed station of such cookers includes a continuously driven endless feed conveyor which advances containers along a linear path and causes the foremost container to contact and be stopped by an abutment plate so that the following containers will move into abutting contact with each other thereby forming a row of containers. The rows formed in this manner are subsequently deflected into the carriers of the processing conveyor that runs through the cooker. Since flat surfaces of the containers, contact each other when forming the rows in these prior art devices, there is little if any tendency for the containers to be deflected out of the rows. However, when cylindrical containers, and especially cylindrical squat cans having chimes on only one end, are moved into abutting contact there is a substantial tendency for the containers to be deflected out of their intended rows. Also, the chimes of adjacent containers tend to move out of their normal planes and come to rest upon one another.

After the containers have been moved into the carriers and have been processed, it has been discovered that the containers, since they are supported on their ends, will not reliably gravitate from the carriers.

SUMMARY OF THE INVENTION

The feed and discharge system of the present invention includes a feed conveyor which advances a series of containers supported on their ends into a feed station and between parallel side guides and below a top guide formed on a pivotal feed mechanism. When the containers are entering the feed station and also when the containers come to rest against a stop at the feed station, the so formed row of containers is prevented from being deflected from their desired alignment by the guides on the feed mechanism.

In order to prevent containers from entering the feed station while another row is in the feed station, an arresting mechanism is provided which includes a resilient arresting pad disposed above the normal path of movement of the containers. The arresting mechanism also includes pivotal bars below and on both sides of the path to engage portions of the containers which overlap the narrow feed conveyor and lift them off the feed conveyor into clamping engagement with arresting pad to temporarily terminate the movement of these containers and all following containers.

After the containers have been processed and have been moved into the discharge station, the containers are positively deflected transversely from the carriers by a discharge mechanism which includes a reciprocating pusher bar that is arranged to move between the rear flanges of adjacent carriers when the carriers are at the discharge station to positively push the row of containers out of the carriers past the other ends or mouth thereof.

BRIEF DESCRIPTION OF THE DRAWINGS

FIG. 1 is a diagrammatic vertical section taken through a hydrostatic cooker having the container feed and discharge system of the present invention associated therewith, certain parts being broken away.

FIG. 2 is an enlarged diagrammatic side view of the feed and discharge stations taken along lines 2–2 of FIG. 1 illustrating the width of the carriers.

FIG. 3 is an enlarged vertical central section taken along lines 3–3 of FIG. 2 illustrating the feed and discharge mechanism, certain parts being shown in phantom lines.

FIG. 4 is a diagrammatic vertical section taken along lines 4–4 of FIG. 2 illustrating certain drive parts and a portion of a pneumatic system.

FIG. 5 is a horizontal section taken along lines 5–5 of FIG. 2 illustrating an arrester mechanism.

FIG. 6 is an enlarged section taken along lines 6–6 of FIG. 5.

FIG. 6A is a section taken along lines 6A–6A of FIG. 6.

FIG. 7 is an enlarged section taken along lines 7–7 of FIG. 6.

FIG. 8 is a diagrammatic operational view showing the pusher bar of the discharge mechanism shortly before being moved between the carriers.

FIG. 9 is a diagrammatic operational view similar to FIG. 8 but showing the pusher bar in its fully extended position.

DESCRIPTION OF THE PREFERRED EMBODIMENT

The feed and discharge system 10 (FIGS. 1—3) of the present invention is associated with a hydrostatic cooker 12 of well-known design. The hydrostatic cooker 12 comprises a frame 13 that includes a pair of spaced vertical support walls 14 that are supported in spaced parallel relationship. A housing 16 which extends between the two walls 14 has a closed upper end 18 and two depending walls 20 and 22 which cooperate with the two walls 14 to define a cooking chamber 24 which is filled with steam at a predetermined cooking pressure and temperature, for example, at about 250 F. to 275° F. and 15 to 20 p.s.i. gauge. The lower end of the housing 16 opens into a water filled trough or chamber 26 which is formed by the two walls 14, a transverse horizontal plate 28 and the lower end portions of two transverse vertical walls 30 and 32. The wall 30 cooperates with another transverse wall 34 to define an inlet hydrostatic water leg 36, and the wall 32 cooperates with a transverse vertical wall 38 to provide an outlet hydrostatic leg 40. The hydrostatic legs 36 and 40 communicate with the chamber 26 and are filled with water so as to create sufficient pressure to resist the pressure of steam in the cooking chamber 24. The inlet hydrostatic water leg 36 is thermostatically controlled to provide a gradually increasing water temperature from approximately 210° F. at its upper end to approximately the sterilizing temperature in the steam chamber at its lower end. The outlet water leg 40 is also thermostatically controlled to provide a gradually decreasing temperature from approximately the sterilizing temperature at its lower end to any suitable temperature below the boiling point of water for example, 85° F. at its upper end. Steam is added to the water in the hydrostatic inlet water leg 36 to provide the desired temperature therein, and cooling water is directed into the outlet or cooling leg 40 to provide the desired cooling temperature therein.

Rows of containers generally designated by the letter C and illustrated as extruded aluminum squat cans having a single chime or bead 42 on the lower end of each can, are advanced through the hydrostatic cooker 12 by a processing conveyor 44 having articulating carriers 46 thereon. The processing conveyor 44 is trained around pairs of sprockets 48 that are rotatably supported by the vertical walls 14, and guide rails 50 (FIG. 2) are secured to the cooker walls so as to guide the conveyor 44 along a circuitous path. The conveyor 44 is driven by a motor 52 which is connected to one or more of the pairs of sprockets 48 by a chain drive 54.

The processing conveyor 44 is also trained around a pair of small diameter sprockets 60 secured to a shaft 62 journaled on the frame 13 at a feed station FS and a discharge station DS, which sprockets effect the opening of the articulating carriers 46 so as to receive and discharge rows of containers therefrom. As best shown in FIG. 3, each carrier 46 includes an elongated web 64 having a wide flange 66 on its rear edge and a generally V-shaped flange 68 on its front or container receiving edge. The flanges 66 and 68 cooperate to confine the rows of containers within their carriers as they are moved by the conveyor 44 through the cooker 12.

As diagrammatically shown in FIG. 2, an endless feed conveyor 70 is disposed immediately adjacent and parallel to the carriers at the feed station FS and has its upper run continuously driven by a variable speed motor 72 in the direction indicated by the arrow A in FIG. 2. Similarly, an endless discharge conveyor 74 is disposed parallel and adjacent to the carriers 46 at the discharge station DS, and its upper run is continuously driven in the direction of arrow B by a variable speed motor 76. Both the feed conveyor and discharge conveyor are preferably Delrin plate top chain conveyors and are driven at speeds sufficient to move a complete row of containers into the feed station FS each time a carrier 46 of the processing conveyor moves therepast, and to move a complete row of containers out of the discharge station DS each time a carrier moves therepast. It should be noted that the width of the feed conveyor 70 (FIG. 5) is less than the diameter of the containers C supported thereon.

As best shown in FIGS. 5, 6 and 6A, an arresting mechanism 78 is associated with the feed conveyor 70 and, after a complete or partial row of containers have been formed in the feed station, serves to clamp and temporarily terminate further movement of the containers moved by the feed conveyor 70 toward the feed station until such time as a feed mechanism 80 (FIG. 3) deflects the previously formed row of containers into the associated carrier 46 and returns to its row receiving position at which time the containers are released by the arresting mechanism 78 allowing another row to be formed in the feed station FS.

The arresting mechanism 78 comprises an abutment plate 82 (FIGS. 5 and 6) secured to one of the walls 14 and has a resilient friction pad 84 bonded to its lower surface. A container lifting mechanism 86 is pivoted by a pin 88 to the frame and comprises a pair of spaced parallel angle bars 90 (FIG. 7) secured to the pivot pin 88 and to an inverted U-shaped yoke 92 (FIG. 6A) which straddles the feed conveyor and the abutment plate 82. The angle bars 90 are positioned on opposite sides of the upper run of the feed conveyor 70 and are normally disposed below the container supporting plane of the upper run. After a full or partial row of containers has been moved into the feed station FS, a pneumatic cylinder 94 connected between the yoke 92 and the frame 13 is activated thereby pivoting the lifting mechanism 86 upwardly about the pivot pin 88 causing the bars 90 to engage and lift the containers within the arresting mechanism upwardly off the feed conveyor 70 into clamping engagement with the friction pad 84 thus terminating movement of these and the following containers. The pneumatic controls for actuating the cylinder 94 will be described hereinafter.

Since the containers are supported on their ends and since cylindrical surfaces of adjacent containers abut each other and exert pushing forces against each other, it will be appreciated that the containers will have a tendency to deflect out of their linear path of movement. Accordingly, side guide rails 100 are provided to center the containers on the feed conveyor and guide the containers into the arresting mechanism 78. In order to prevent the chimes 42 of adjacent containers from resting upon one another, as opposed to lying in a common plane, an upper guide bar 102 is disposed immediately above the path of the containers. The rails 100 and bar 102 are connected to the frame 13 by suitable brackets 104, only one bracket being shown in FIGS. 6 and 7.

The feed mechanism 80 (FIG. 3) is disposed at the feed station FS and serves to deflect the rows of containers transversely into the carriers 46 as the carriers move therepast. The feed mechanism 80 includes a pusher bar 106 and a guide bar 108 that are secured to a tube 110 by spaced arms 112 and 114, respectively. The pusher bar 106 and guide bar 108 serve to retain the containers in a straight row as they are conveyed into the feed station by the feed conveyor 70 and come to rest against an abutment 115 (FIG. 2). An angle bar 116 is disposed over the containers to maintain the chimes 42 thereof in a common plane, and is connected for vertical adjustment to a support bar 117 by bolts which extend through slots in the angle bar 116. The bar 117 is secured to the arms 112 as by welding. The tube 110 is journaled on a shaft 118 secured to the frame and is moved between a retracted or row receiving position and an extended or row discharging position as illustrated in full and dotted lines, respectively, in FIG. 3.

The feed mechanism is moved between the row receiving and row discharging positions by a pneumatic cylinder 120 (FIG. 4) which is pivotally connected between the frame 13 and an arm 121 secured to the tube 110. As diagrammatically illustrated in FIG. 4, the pusher bar 106 and guide bar 108 are moved from the illustrated retracted position to the extended position in response to a lobe 124 of a cam 126 keyed to shaft 62 contacting and actuating a pneumatic vent valve 128 which controls the position of the core K of a master valve V. The pusher bar 106 and guide bar 108 are returned to their retracted position in response to the arm 121 contacting and actuating a second pneumatic vent valve 130.

The master valve V is of the well-known type which receives high-pressure air from a pressure line P and continuously directs pressure to both ends of the valve through small passages P1. Thus, the momentary opening of the vent valve 128 will cause the core K to shift to the right (FIG. 4) thereby directing high-pressure air into the right end (FIG. 4) of the pneumatic cylinder 120 causing the feed mechanism to deflect a row of containers into the associated carrier 46. When the arm 121 opens vent valve 130, the left end of the master valve V is vented causing high-pressure air on the other end of the core to shift the core toward the left to the position illustrated in FIG. 4. When the core K is in this position, high-pressure air enters the left end (FIG. 4) of the pneumatic cylinder 120 thereby returning the feed mechanism 80 to the row receiving position.

The pneumatic controls for actuating the cylinder 94 of the aforementioned arresting mechanism 78 is illustrated in FIGS. 4 and 6 and is activated each time a carrier 46 moves past a feed station whether or not containers are present in the feed station. A master valve V' (FIG. 6) is identical to the valve V and has its core K' shifted to the left as shown in FIG. 6 each time a vent valve 132 (FIG. 4) is opened, which vent valve is connected to the left end of the valve V' by a conduit 134. The vent valve is actuated by the lobes 124 of the cam 126 shortly before the feed mechanism 80 is activated thus raising the lifting mechanism 86 to clamp the containers against the resilient pad 84. The core K' is shifted to the right in response to opening of the vent valve 130 (FIG. 4) thereby returning the lifting mechanism 86 to its lower inactive position. The vent valve 130 is connected to the right end of the master valve V' by a conduit 136 and high-pressure air enters the valve V' through conduit P'.

After the containers have been loaded into the carriers 46 they are moved by the continuously driven processing conveyor 44 (FIG. 1) through the inlet hydrostatic water leg 36, the cooking chamber 24, and the outlet hydrostatic water leg 40 during which time the contents of the containers are cooked and cooled.

Since the containers are supported on their ends, i.e. on flat surfaces rather than on cylindrical surfaces, the containers must be positively pushed from the carriers 46 as they move past the discharge station DS. Accordingly, a discharge mechanism 150 (FIGS. 3, 4, 8 and 9) is provided for pushing the rows of containers C out of the carriers 46. The discharge mechanism includes an elongated arcuate pusher bar 152 which has a resilient container contacting bumper 154 secured on its forward edge so as to preclude denting of the containers. The bar 152 is mounted on the upper end of a reciprocating box frame 156 which includes upper and lower tubular members 158 connected together by spaced upright arms 160, only one arm being shown. The lower end of each arm 160 is pivotally connected to one end of a lever 162, and each lever 162 is keyed to a pivot shaft 164 that is journaled in the frame 13. As indicated in phantom lines in FIG. 3 and in solid lines in FIG. 4, one end of an actuating lever 166 is keyed to the shaft 164 and its other end has a cam follower 167 journaled thereon and which rides along the periphery of an oval cam 168 keyed to a cam shaft 169. The periphery of the cam 168 is shaped so as to maintain the bumper 154 in alignment with the space between adjacent rear flanges 66 of two adjacent carriers 46 as the two carriers move upwardly past the feed station, and thereafter lower the pusher bar 152 and bumper 154 so that they become positioned between the rear flanges of the next lower pair of carriers. It will be noted that 1 revolution of the cam shaft 169 will cause the pusher bar 152 to move upwardly and downwardly twice in its carrier tracking operation.

In order to cause the pusher bar 152 and bumper 154 to move between adjacent carriers 46 when at the feed station and to push the row of containers C therefrom, each arm 160 is pivotally connected to one end of a bellcrank 172 by a link 174. Each bellcrank 172 is keyed to a pivot shaft 176 journaled in the frame 13 and has a cam follower 178 journaled on its free end. The cam followers ride along the outer periphery of identical cams 180 that are journaled on the cam shaft 169. The periphery of the cams 180 is such that the bumper 154 is normally disposed rearwardly out of the path of movement of the carriers, and is moved between the associated carriers to push a row of containers therefrom when the cam followers 178 are moved, twice for each revolution of the shaft 169, into recesses 182. The weight of the discharge mechanism 150 is sufficient to urge the cam followers 178 into the recesses 182 and, accordingly, provides the necessary force to push the containers out of the carriers 46. It will be understood, however, that springs, not shown, may be provided to increase the container discharging force if desired.

It will be noted that lead-in portions 190 of gradually reducing diameter allows the cam followers 178 to gradually enter the recesses 182 allowing the bumper 154 to gently contact the containers thus minimizing the tendency of denting thin walled containers.

As indicated in FIG. 4, the shaft 62 is connected to an idler shaft 192 by a gear drive 194, and the idler shaft is connected to the cam shaft 169 by a chain drive 196. The gear drive 194 and chain drive 196 are arranged to drive the shaft 169 4 revolutions for each revolution of the shaft 62 thus actuating the discharge mechanism 150 once each time a carrier bar moves past the discharge station DS.

As the rows of containers are pushed from the carriers 46 at the discharge station DS, they slide down an inclined ramp 198 (FIG. 3) onto the discharge conveyor 74. An abutment wall 200, and the lower edge 202 of the ramp 198 cooperate to guide the containers out of the discharge conveyor 74. A conveyor guard plate 204 is provided below the ramp 198 to prevent inadvertent injury of an operator.

In operation, the motors 52 (FIG. 1), 72 and 76 (FIG. 2) are started thus continuously driving the processing conveyor 44, the feed conveyor 70, and the discharge conveyor 74. Steam is introduced into the cooking chamber at the desired temperature and pressure for the particular product being cooked, and the water in the inlet hydrostatic leg 36 and discharge hydrostatic leg 40 are maintained at the desired temperature. Container C, such as aluminum squat cans having beads 42 only on their lower ends are introduced into the feed conveyor by any suitable means such as a chute (not shown). The feed conveyor 70 moves the containers past the arresting mechanism 78 during which time the containers are guided by the rails 100 (FIG. 7) and bar 102 to maintain the containers in alignment and to prevent the chimes of adjacent containers to ride upon one another. The foremost container enters the feed station FS and is guided along a linear path by the pusher bar 106 (FIG. 3), guide rail 108 and angle bar 116, and comes to rest against the container abutment 115 causing all following containers to move into abutting contact and terminate their movement in the direction of arrow A in Fig. 2. Normally, containers are fed into the feed station at a sufficient rate to form a complete row of containers for each carrier 46. However, it will be understood that a complete row need not be formed and that the feed mechanism will operate satisfactorily when only partial rows are formed. Whether or not a complete row is formed at the feed station FS, the pneumatic cylinder 94 is activated immediately before each carrier 46 is moved into position to receive a row of containers thereby raising the lifting mechanism 86 thus lifting the containers therein off the feed conveyor and into clamping engagement against the resilient pad 84 (FIG. 6) thus terminating further movement from all following containers.

As each carrier 46 to be filled moves into position at the feed station to receive a row of containers, the pneumatic cylinder 120 is activated thereby deflecting the row of containers into the adjacent carrier 46. After the row of containers has entered the carrier, the vent valve 130 is opened thereby returning the feed mechanism 80 to its container receiving position and the arresting mechanism 78 to its lowered position permitting other containers to move therepast to form additional rows in the feed station.

The above operation is repeated for each carrier 46 passing the feed station thereby forming one row for each carrier and deflecting each row of containers into an associated carrier as the carrier moves past the feed station FS. The processing conveyor 44 then carries the rows of containers through the several chambers of the cooker 12 during which time the contents of the containers are cooked or sterilized and are thereafter cooled.

The carriers and processed containers are then advanced upwardly into the discharge station DS. During this continuous upward movement of the carriers, the pusher bar 152 of the discharge mechanism 150 is arranged to follow each carrier, in turn, upwardly for a short distance and when the carrier reaches the discharge ramp 198 to move between the wide flanges of the carrier that is supporting the row of containers and the carrier immediately thereabove, thereby positively pushing the row of containers from the carriers. The row of containers then gravitates down the inclined ramp 198 onto the discharge conveyor 74 which removes the processed containers from the cooker. All of the rows of containers are positively discharged from their carriers as above described thereby allowing each emptied carrier to return to the feed station to receive another row of containers to be processed.

From the foregoing description it is apparent that the feed and discharge system of the present invention provides a mechanism for first guiding cylindrical containers supported on their ends into elongated rows of containers and for deflecting each row of containers transversely into an associated carrier mounted on a processing conveyor. After the rows of containers have been processed, the rows are positively pushed from their carriers by a discharge mechanism which includes an elongated pusher bar that tracks each carrier in turn, while moving past the discharge station and causes the pusher bar to move between adjacent carriers thereby positively pushing the processed row of containers therefrom.

Although the preferred embodiment of the invention has been described and illustrated in conjunction with squat cylindrical cans having beads on only one end, it will be understood that the apparatus can also handle other types of containers such as squat cans of square cross section supported on one end or cylindrical containers having chimes on both ends and supported either on their ends or on their sides.

Although the best mode contemplated for carrying out the present invention has been herein shown and described, it will be apparent that modification and variation may be made without departing from what is regarded to be the subject matter of the invention.

We claim:

1. In a feed and discharge system for a cooker including a cooking chamber: the combination of an endless processing conveyor movable through said cooking chamber, said processing conveyor being of the type having articulating carriers thereon, and said conveyor being trained around small diameter sprockets at the feed and discharge stations which sprockets open the carriers sufficiently to allow rows of containers to be fed into and discharged from the carriers; a plurality of elongated carriers on said conveyor; means defining a feed station adjacent a conveyor; said feed station including a feed conveyor for moving containers supported on their ends in a predetermined direction into position to be deflected into the carriers, means for terminating movement of the containers in said predetermined direction for forming a row of abutting containers in said feed station, means for deflecting the row of spaced containers into one of said carriers, and guide means carried by said deflecting means for guiding both sides and the upper surfaces of the containers while the containers are in said feed station for maintaining the containers in a straight line; arresting means for holding other containers from entering said feed station while said deflecting means is moving the row of containers into one of said carriers; and means at a discharge station for discharging the rows of containers from the carriers after passing through the cooking chamber; said deflecting means being pivotally mounted about an axis which allows the guide means that engages the side of the containers adjacent the carriers to pivot upwardly and out of the transverse path of movement of the row of containers as the row of containers enters the carriers.

2. An apparatus according to claim 1 wherein the containers are cylindrical containers having substantially flat ends with chimes on one end only.

3. In a feed and discharge system for a cooker including a cooking chamber; the combination of an endless processing conveyor movable through said cooking chamber; a plurality of elongated carriers on said conveyor; means defining a feed station adjacent said conveyor; said feed station including a feed conveyor for moving containers supported on their ends in a predetermined direction into position to be deflected into the carriers, means for terminating movement of the containers in said predetermined direction for forming a row of abutting containers in said feed station, means for deflecting a row of spaced containers into one of said carriers, and guide means carried by said deflecting means for guiding both sides of the upper surfaces of the containers while the containers are in said feed station for maintaining the containers in a straight line; arresting means for holding the other containers from entering said feed station while said deflecting means is moving the row of containers into one of said carriers; and means at a discharge station for discharging the rows of containers from the carriers after passing through the cooking chamber; said feed conveyors supporting the containers with the edges of said containers projecting outwardly beyond the sides of said feed conveyor, and wherein said arresting means includes an abutment plate having a resilient pad on its lower surface disposed above the path of movement of said containers, and means for engaging the overlapping edges of certain of the containers approaching the feed station and lifting these containers off the feed conveyor into clamping engagement with said resilient pad.

4. In a feed and discharge system for a cooker including a cooking chamber; the combination of an endless processing conveyor movable through said cooking chamber; a plurality of elongated carriers on said conveyor; means defining a feed station adjacent said conveyor; said feed station including a feed conveyor for moving containers supported on their ends in a predetermined direction into position to be deflected into the carriers, means for terminating movement of the containers in said predetermined direction for forming a row of abutting containers in said feed station, means for deflecting the row of spaced containers into one of said carriers, and guide means carried by said deflecting means for guiding both sides and the upper surfaces of the containers while the containers are in said feed station for maintaining the containers in a straight line; arresting means for holding other containers from entering said feed station while said deflecting means is moving the row of containers into one of said carriers; and means at a discharge station for discharging the rows of containers from the carriers after passing through the cooking chamber; said discharge means including an elongated pusher bar, means for reciprocating the pusher bar for maintaining the pusher bar centered relative to each pair of adjacent carriers as the carriers move past said discharge station, and means for moving the pusher bar between each pair of adjacent carriers to push the rows of processed containers therefrom as each pair of carriers move past the discharge station.

5. An apparatus for feeding rows of containers supported on their ends into carriers comprising a driven processing conveyor movable past a feed station, a plurality of spaced elongated carriers on said processing conveyor, a driven feed conveyor having a portion parallel to and immediately adjacent said carriers at said feed station for moving containers along a linear path into said feed station, first guide means associated with said feed conveyor for guiding both sides and the upper surface of the containers along said path, abutment means for terminating the movement of the foremost container as it moves to one end of said path in the feed station, movable arresting means disposed adjacent the other end of the feed station for movement between a bypass position allowing the containers to enter the feed station and an arresting position preventing movement of the containers into the feed station, feed means movable between an active position for deflecting a row of containers into a carrier and an inactive position for accumulating a row of abutting containers, second guide means supported by and movable with said feed means for guiding both sides and the upper surface of the containers as they move along said path and come to rest in said feed station, power means for moving said arresting means and said feed means, and control means for moving the arresting means to its arresting position shortly before a carrier reaches the feed station and for moving the feed means to its active row deflecting position as the carrier reaches the feed station and for thereafter returning the arresting means to its bypass position and the feed means to its row accumulating position.

6. An apparatus for discharging rows of containers supported on their ends from articulating carriers of an endless processing conveyor comprising, means for continuously driving said conveyor, means at a discharge station for moving the conveyor around an arcuate path to open said carriers, an elongated pusher bar, means for intermittently moving said pusher bar with said conveyor for maintaining the pusher bar centered relative to each pair of adjacent carriers as the carriers move past a discharge station, means for advancing and retracting the pusher bar between each pair of adjacent carriers to push the row of containers therefrom as each pair of carriers move past the discharge station, and means for accepting the discharged row of containers and thereafter moving the discharged rows of containers away from the discharge station.

7. An apparatus for discharging rows of containers from articulating carriers of an endless processing conveyor comprising, means for continuously driving said conveyor, means at a discharge station for moving the conveyor around an arcuate path to open said carriers, an elongated pusher bar, means for intermittently moving said pusher bar with said conveyor for maintaining the pusher bar between adjacent containers confining carriers as the carriers move past a discharge station, means for advancing and retracting the pusher bar between said adjacent carriers to push the row of containers therefrom as said adjacent carriers move past the discharge station, and means for accepting the discharged row of containers and thereafter moving the discharged row of containers away from the discharge station.